US007342673B2

(12) United States Patent
Grimm et al.

(10) Patent No.: US 7,342,673 B2
(45) Date of Patent: Mar. 11, 2008

(54) DEVICE FOR DEFINING PARTICIPANTS OF A CONTROL SYSTEM FOR A PRINTING MACHINE

(75) Inventors: Ulrich Grimm, Dielheim (DE); Silke Husterer, Bammental (DE); Thomas Husterer, Bammental (DE); Georg Roessler, Angelbachtal (DE); Andreas Wagner, Graben Neudorf (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 897 days.

(21) Appl. No.: 10/006,580

(22) Filed: Dec. 4, 2001

(65) Prior Publication Data

US 2002/0099889 A1 Jul. 25, 2002

(30) Foreign Application Priority Data

Dec. 4, 2000 (DE) ................................ 100 60 216

(51) Int. Cl.
*G06F 15/00* (2006.01)

(52) U.S. Cl. ................. 358/1.1; 358/1.15; 235/462.15; 710/301

(58) Field of Classification Search ................. 358/1.1, 358/1.15; 710/301; 235/462.15
See application file for complete search history.

(56) References Cited

U.S. PATENT DOCUMENTS

| | | | | |
|---|---|---|---|---|
| 5,013,981 | A | 5/1991 | Rodi | 318/67 |
| 5,556,290 | A * | 9/1996 | Northey et al. | 439/188 |
| 5,703,347 | A | 12/1997 | Reddersen et al. | 235/462.15 |
| 6,438,500 | B1 * | 8/2002 | Froger et al. | 702/55 |
| 6,487,621 | B1 * | 11/2002 | MacLaren | 710/240 |
| 6,757,751 | B1 * | 6/2004 | Gene | 710/36 |
| 6,785,780 | B1 * | 8/2004 | Klein et al. | 711/148 |
| 6,920,416 | B1 * | 7/2005 | Swoboda et al. | 703/13 |
| 2002/0023187 | A1 * | 2/2002 | Chang et al. | 710/301 |
| 2002/0059492 | A1 * | 5/2002 | Sabotta et al. | 710/301 |

FOREIGN PATENT DOCUMENTS

| | | | |
|---|---|---|---|
| DE | 35 41 277 | C2 | 5/1987 |
| DE | 43 42 052 | A1 | 6/1995 |
| DE | 296 17 239 | U1 | 1/1997 |
| DE | 199 57 275 | A1 | 6/2000 |
| EP | 0 834 963 | A2 | 4/1998 |
| JP | 11 176 519 | A | 7/1999 |

* cited by examiner

*Primary Examiner*—Twyler Lamb
*Assistant Examiner*—Mark R. Milia
(74) *Attorney, Agent, or Firm*—Laurence A. Greenberg; Werner H. Stemer; Ralph E. Locher

(57) ABSTRACT

A device for defining participants in a control system that controls a printing machine is provided. The control system includes a central computer and a number of participants which interact with the central computer in order to carry out processes. The participants are connected to one another via lines of a bus system. The lines of the bus system and the participants have respective plugs for connecting the lines of the bus system to the participants. The plugs of the lines of the bus system have reserved plug contacts which are provided with one or more galvanic links for defining the respective participants.

6 Claims, 1 Drawing Sheet

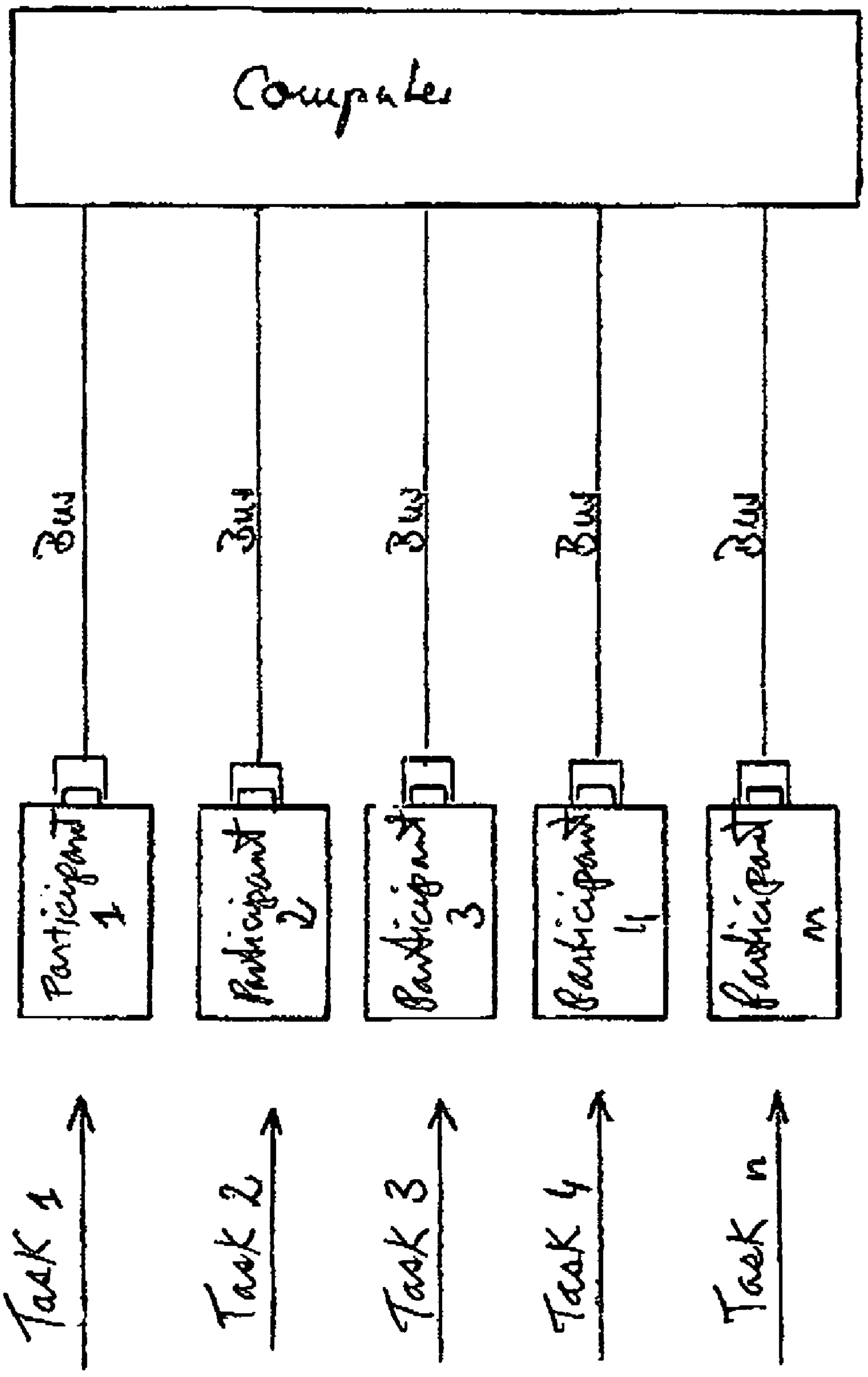
Computer
Bus
Bus
Bus
Bus
Bus
Participant 1
Participant 2
Participant 3
Participant 4
Participant n
Task 1
Task 2
Task 3
Task 4
Task n

DEVICE FOR DEFINING PARTICIPANTS OF A CONTROL SYSTEM FOR A PRINTING MACHINE

BACKGROUND OF THE INVENTION

Field of the Invention

The invention relates to a device for defining participants of a control system for a printing machine.

In complex, computer-aided control systems, a central computer circuit board may be connected to a plurality of further circuit boards, for example via bus systems. The circuit boards then carry out identical or different functions of the control system. The circuit boards which carry out the functions of the control system will be referred to as "participants" in the following text. In order to define a participant in a control system, the participant being specified to perform specific tasks, it is known to construct the participant in a neutral manner and only to determine the actual purpose or intention of the participant through the use of a measure on site. Measures of this type can be carried out on the participant on site, for example through the use of so-called jumpers or through the use of DIL (Dual In-Line) switches.

Published European Patent Application No. EP 0 834 963 A2 discloses a device for coding flat subassemblies. This coding device is preferably configured as a frame, which can either be placed onto the plug-in connection or onto the flat subassembly. The coding device mechanically prevents that a contact is being made between plug-in connections and flat subassemblies which do not belong together.

As a further possibility, the participant can also be equipped with a non-volatile memory, in which the address of the participant and therefore its actual intention is stored. The non-volatile memory is then preprogrammed, either at the factory before the commissioning of the plant or, in the event of a replacement, by a service engineer.

SUMMARY OF THE INVENTION

It is accordingly an object of the invention to provide a device for defining participants of a control system which overcomes the above-mentioned disadvantages of the heretofore-known devices of this general type and which implements a unique definition of the various participants on a control system without adjustment work having to be carried out on the respective circuit board of the participant.

With the foregoing and other objects in view there is provided, in accordance with the invention, a device for defining control system participants, including:

a control system configured to control a printing machine, the control system including a central computer and a plurality of participants, the participants interacting with the central computer in order to carry out processes;

a bus system including lines, the participants being connected to one another via the lines of the bus system;

the lines of the bus system and the participants having respective plugs connecting the lines to the participants; and at least given ones the plugs of the lines of the bus system having reserved plug contacts, the reserved plug contacts being provided with at least one galvanic link.

According to another feature of the invention, the at least one galvanic link is connected to a given voltage potential.

According to yet another feature of the invention, the reserved plug contacts are free connections of a respective one of the plugs, the at least one galvanic link is fitted to the free connections.

With the objects of the invention in view there is also provided, in combination with a printing machine including a control system with a central computer, a device for defining participants of a control system, including:

a plurality of participants interacting with the central computer in order to carry out processes;

a bus system including lines, the participants being connected to one another via the lines of the bus system;

the lines of the bus system and the participants having respective plugs connecting the lines to the participants; and at least given ones the plugs of the lines of the bus system having reserved plug contacts, the reserved plug contacts being provided with at least one galvanic link.

It is assumed that the participants for controlling a printing machine are connected by a set of lines which, for example, represents a field bus system. Using the set of lines, the various participants for controlling the printing machine are connected, which is usually implemented through the use of a plug-in connection. In this case, the location (participant or set of lines) at which the plug part or socket part is fitted is not important. Furthermore, it is assumed that not all the contacts in the plug or socket part are used for controlling the machine or that these are not allocated. As a result, there is the possibility of using the unallocated contacts in the plug-in connection for the definition or identification of a participant.

According to the invention, in the simplest case a galvanic link is provided between two unallocated plug contacts in the plug part belonging to the set of lines. This galvanic link is detected and interpreted by the participant for controlling the printing machine. The interpretation is carried out in such a way that only one address combination which makes it possible for the participant to respond is possible.

On the circuit board of the participant, a device interrogates the galvanic link in the plug part of the set of lines as though the corresponding adjustment has been performed through the use of jumpers or DIL switches. In this case, the participant is kept completely neutral and, in the event of service, can also be replaced by a non-specialist. In particular in cases in which a number of participants satisfy tasks with different priorities on a printing machine, for example the main drive of the machine and an auxiliary drive for the varnishing unit, in the event of failure of the participant for the main drive, a replacement with the participant for the auxiliary drive can be carried out by the printer and the machine continues to be usable in emergency operations.

Of course, it is conceivable that combinations of galvanic links are used or that individual plug contacts are connected to a defined potential (VCC or ground) of the voltage supply. Should all the plug contacts of the plug-in connection be allocated for the data transfer, it is conceivable for contacts of other plug-in connections, for example the voltage supply, to be used for address identification. It is noted that it is completely unimportant what type of plug connector is used.

Other features which are considered as characteristic for the invention are set forth in the appended claims.

Although the invention is illustrated and described herein as embodied in a device for defining participants of a control system for a printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE is a block diagram for illustrating participants of a control system and a set of lines according to the invention.

DESCRIPTION OF THE PREFERRED EMBODIMENTS

Referring now to the single FIGURE in detail, there is shown a central computer 10 and a number of participants 1, 12, 14 for a printing machine. The FIGURE shows a participant 1 which, in the form of a populated circuit board, a so-called flat subassembly or flat module, includes a plurality of components 5, 6 and 7 combined into groups. The components 5, 6, 7 in each case perform or satisfy different tasks for the participant; of course, it is also possible for the participant to have a different composition of components. In addition, the participant 1 carries a row of plugs 2, 3, 4, which are illustrated here as socket parts. In this case, again the number of plug contacts and the number of connections from a plug contact to a component as such is completely unimportant. It is likewise unimportant whether socket parts or plug parts or a mixed form are fitted to the participant. The plugs 2', 3' and 4' are associated with a set of lines 8, wherein the plugs 2', 3' and 4', in an appropriate way, fit together with the plugs 2, 3, 4 and connect the participant 1 via the set of lines 8 to a computer part, which may be a central computer 10. The set of lines 8 constitutes, for example, a field bus system, wherein it is also possible that lines for the voltage supply and signal lines for analog signals are provides in the set of lines 8. Likewise, plugs 2', 3', 4' could also be specified in accordance with their task. A galvanic link or electrical link 9 connects two plug contacts in the plug 4'. This galvanic link 9 is connected by the connection of the two plugs 4, 4' to components 7. These components 7 are specified to determine the defined address of the participant 1 and therefore to follow only instructions which are carried out under the address intended for it. As already mentioned, the participant 1 is kept neutral and is only defined or set by the address interrogation, which is defined here in the example by the plug 4'.

We claim:

1. A device for defining a control system with a plurality of neutral participants, the device comprising:

a control system configured to control a printing machine, said control system including a central computer and a plurality of the neutral participants, the neutral participants interacting with said central computer in order to carry out processes;

a bus system including lines, the participants being connected to said central computer via said lines of said bus system;

said lines of said bus system and the participants having respective plugs connecting said lines to the participants;

at least one of said plugs of said lines of said bus system having reserved plug contacts, said reserved plug contacts being provided with at least one galvanic link, and said at least one galvanic link being detected and interpreted by a participant; and at least one component included in the participant determining the defined address of the participant.

2. The device according to claim 1, wherein said at least one galvanic link is connected to a given voltage potential.

3. The device according to claim 1, wherein said reserved plug contacts are free connections of a respective one of said plugs, said at least one galvanic link is fitted to said free connections.

4. In combination with a printing machine including a control system with a central computer, a device for defining control system participants, comprising:

a plurality of neutral participants interacting with the central computer in order to carry out processes;

a bus system including lines, said neutral participants being connected to the central computer via said lines of said bus system;

said lines of said bus system and said neutral participants having respective plugs connecting said lines to said participants;

at least one of said plugs of said lines of said bus system having reserved plug contacts, said reserved plug contacts being provided with at least one galvanic link, and said at least one galvanic link being detected and interpreted by a participant; and at least one component included in the participant determining the defined address of the participant.

5. The device according to claim 4, wherein said at least one galvanic link is connected to a given voltage potential.

6. The device according to claim 4, wherein said reserved plug contacts are free connections of a respective one of said plugs, and said at least one galvanic link is fitted to said free connections.

* * * * *